Feb. 14, 1967 D. C. RASMUSSEN ETAL 3,304,083

HIGH SPEED CARD STACKING DEVICE

Filed Sept. 3, 1964 5 Sheets-Sheet 1

INVENTORS
DONALD C. RASMUSSEN
WALTER ROHRBACH
BY CHARLES EUMURIAN

Daniel J. Meaney Jr.
PATENT AGENT

HIGH SPEED CARD STACKING DEVICE

Filed Sept. 3, 1964 5 Sheets-Sheet 2

INVENTORS
DONALD C. RASMUSSEN
WALTER ROHRBACH
BY CHARLES EUMURIAN
Daniel J. Meaney Jr
PATENT AGENT INVENTORS
DONALD C. RASMUSSEN
WALTER ROHRBACH
BY CHARLES EUMURIAN
Daniel J. Meaney Jr
PATENT AGENT Feb. 14, 1967 D. C. RASMUSSEN ETAL 3,304,083

HIGH SPEED CARD STACKING DEVICE

Filed Sept. 3, 1964 5 Sheets-Sheet 4

INVENTORS
DONALD C. RASMUSSEN
WALTER ROHRBACH
BY CHARLES EUMURIAN

Daniel J. Meaney Jr.
PATENT AGENT

INVENTORS
DONALD C. RASMUSSEN
WALTER ROHRBACH
BY CHARLES EUMURIAN
Daniel J. Meaney Jr.
PATENT AGENT 3,304,083

HIGH SPEED CARD STACKING DEVICE

Donald C. Rasmussen, Minnetonka, Walter Rohrbach, Minneapolis, and Charles Eumurian, St. Paul, Minn., assignors to Control Data Corporation, Minneapolis, Minn., a corporation of Minnesota Filed Sept. 3, 1964, Ser. No. 394,212
10 Claims. (Cl. 271—71)

This invention relates to a high speed card stacking device and more particularly to stacking apparatus which keeps the trailing of a stacked card from impacting with the leading edge of a card being stacked.

In modern high speed card stacking devices, documents such as 80 column punched cards, 51 column punched cards, record cards, checks and the like are received sequentially and are stacked in their original order at rates in excess of 1000 cards per minute. It becomes necessary that the cards being stacked at this high rate be processed and deposited in a card stack at a high linear velocity. When these cards are subsequently stacked, the cards must be decelerated from their high linear velocity to zero velocity in a short period of time. Further, the trailing edge of the stacked card must be kept from impacting with the leading edge of a card being stacked, which card would be traveling at the high linear velocity.

It is known to stack cards at a high speed wherein the trailing edge of the card is disposed away from the path of a subsequent card's leading edge.

Several techniques have been used to snap or rebound the trailing edge of a card being stacked and to thereafter utilize gravity to direct the card into a stacked relation. Other techniques having included means for urging the trailing end of a card away from a subsequent leading edge by applying the urging force to the surface of the card.

These techniques have several disadvantages when used for high speed card stacking. Some of the disadvantages are that a continuously rotating member is continually in contact with the last card of a stack thereby operating as one of the stacking walls. Further, this continuously rotating roller would be rotating at a high speed and would wear the surface of the card. In a high speed card stacker, a roller rotating at a high angular velocity would wear through the card surface in a short period of time. Other devices require that the trailing edge of a card be snapped and require that the card be guided through a large area under the force of gravity. Thus a device such as this has the disadvantage of requiring a large area for stacking. Further, a device using gravity to stack the cards has the disadvantage of being limited in the operation of stacking cards wherein the longitudinal axis of the card is parallel to the predetermined path.

Other apparatus used for stacking have means to urge the trailing end of the card away from an incoming card while urging the card into the stack. The disadvantage of this system is that the urging force is applied to the card surface. Since the holes in the punched cards vary from card-to-card, there is not a uniform surface upon which to apply an urging force. Further, the disadvantage of this becomes more apparent when each card contains more and more data in the form of holes. The surface area against which the urging force is applied decreases as the number of punched holes increase. Further, as the number of punched holes increase, the card becomes less rigid thereby making the operation of urging the trailing surface away to prevent impact less reliable at high stacking speeds.

In this invention, the above disadvantages are overcome by driving the leading edge of the card to be stacked into a card stack wherein the continually rotating high speed rollers do not continually rub against the surface of the card and wherein the trailing edge of the card being stacked is snapped into contact with a stacking roller which urges the trailing edge away from the leading edge of a subsequent card to be stacked. In this invention, use is made of the card edge in urging the trailing edge away from oncoming cards. The edge of a card receiving the urging force is similar in all cards and does not vary from card-to-card as does the surface area which is a function of the number of punched holes.

Therefore, it is the principal object of this invention to provide an improved high speed card stacking device which utilizes the flexing and snapping of the trailing edge of a card to be stacked to prevent impact with the leading edge of a subsequent card being stacked.

It is another object of this invention to provide a roller which receives the snapped trailing edge of a card and urges that edge away from the predetermined path of the leading edge of a subsequent card being stacked.

Yet another object of this invention is to provide an embodiment of a high speed stacking device which can easily be converted from an 80 column punched card stacker to accommodate 51 column punched cards.

These and other objects and the entire scope of the invention will become more fully apparent when considered in light of the following detailed description of an illustrative embodiment of this invention and from the appended claims.

The illustrative embodiment may be best understood by reference to the accompanying drawings within:

Briefly, this invention discloses a high speed card stacking device having means to advance a card on edge along a predetermined path. The card to be stacked is advanced into a pair of oppositely rotating rollers disposed to receive and advance the card. A guide member is situated near one of the rollers to form a throat therebetween defining the predetermined path. A stationary stacking wall is positioned to hold the card stack with the last card of the stack and the stationary stacking wall substantially intersecting to form an acute angle to receive the leading edge of the card being advanced by the rollers. The card stack is supported by a support which is movable to allow the size of the stack to grow as the cards are stacked. An assist roller is disposed relative to the rollers to engage and advance the card when the trailing edge of the card has been advanced into the acute angle formed by the stacking wall and the last card of the stack. The assist roller is also disposed to transversely flex the card relative to its predetermined path while advancing the trailing edge past the guide member. The trailing edge of the card will snap away from the guide member due to the card's tendency to straighten itself relative to the predetermined path. A stop member is situated to cooperate with the stationary stacking wall to form an end wall. The end wall is positioned to contact the leading edge of the card being stacked and causes the card to slightly rebound back toward the throat. A stacking roller is positioned such that the distance between the stacking roller periphery and the stop member is less than the peripheral dimension of the card. The stacking roller is further disposed in relation to the location of the guide member to urge the trailing edge of the snapped card away from the throat to prevent impact between the trailing edge of the stacked card and the leading edge of a subsequent card being stacked.

Figure 1:
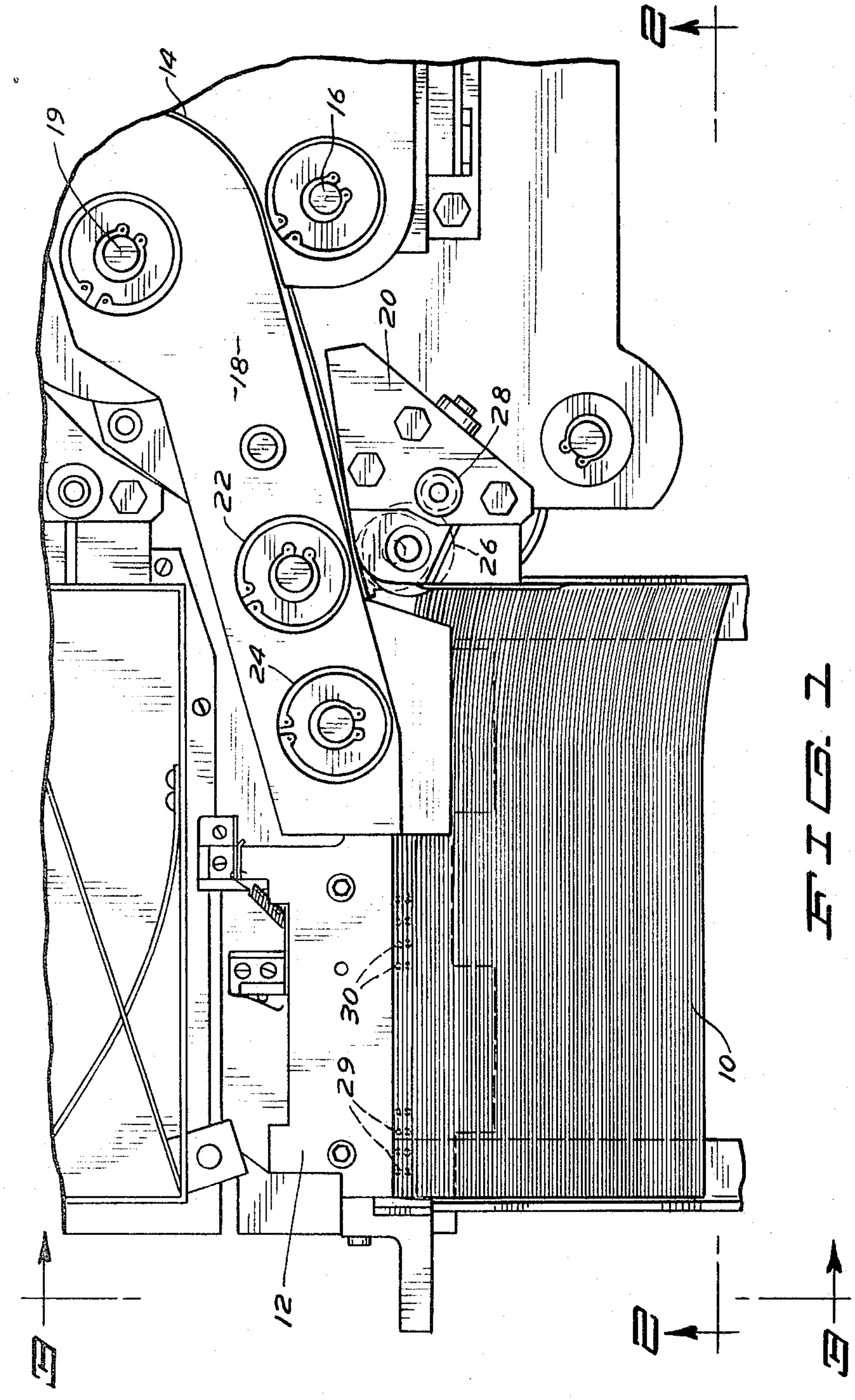
FIG. 1 illustrates an overall top view of the high speed stacking device for use as an 80 column card stacker.

FIGURE 1 illustrates an overall top view of the high speed stacking device. A portion of a card stack 10 is shown against a stationary stacking wall 12. The cards to be stacked are supplied from a device such as a card reader (not shown), which delivers the card on edge. The cards to be stacked may typically be either on 80 column or 51 column punched card which is known in the data processing field. Also any document having similar characteristics to that of the punch card may be used.

In this embodiment, the cards are stacked such that their longitudinal axis are parallel to their path of travel. The cards to be stacked are received via predetermined path 14. The cards are then passed via the predetermined path 14 by roller 19 and idler roller 16 which advances the card on edge along the path. Roller 16 advances the incoming card into a card plate 18 having a decreasing face taper. The card plate taper cooperates with a face taper of roller stack assembly 20 to guide the leading edge of the card into final feed roller 22. The feeder roller 22 engages an idler roller (visible on FIGURE 5 as 102). The leading edge of the card to be stacked passes through the nip of the feed roller 22 and its idler roller 102. Thereafter, the card is driven into the stack 10 by the rollers 22 and 102. An assist roller 24 is disposed to assist the feed roller 22 in driving the card. Also the assist roller is disposed relative to the feed roller 22 and the card stack 10 to flex the card transversely relative to its predetermined path as will become apparent hereinafter. After the leading edge of the card has been driven completely into the stack, the trailing edge of the flexed card snaps into contact with a stacking roller 26. The stacking roller 26 urges the cards trailing edge away from the area of the feed roller 22 to prevent impact between the trailing edge of the stacked card and the leading edge of a card being stacked. Stacking roller 26 is driven by a shaft roller 28 as will be described. The two groups of air jets 29 and 30 function to distribute air between the cards in the vicinity of the stationary stacking wall 12 to to provide an air cushion thereby slightly separating the cards to aid the stacking.

Figure 2:
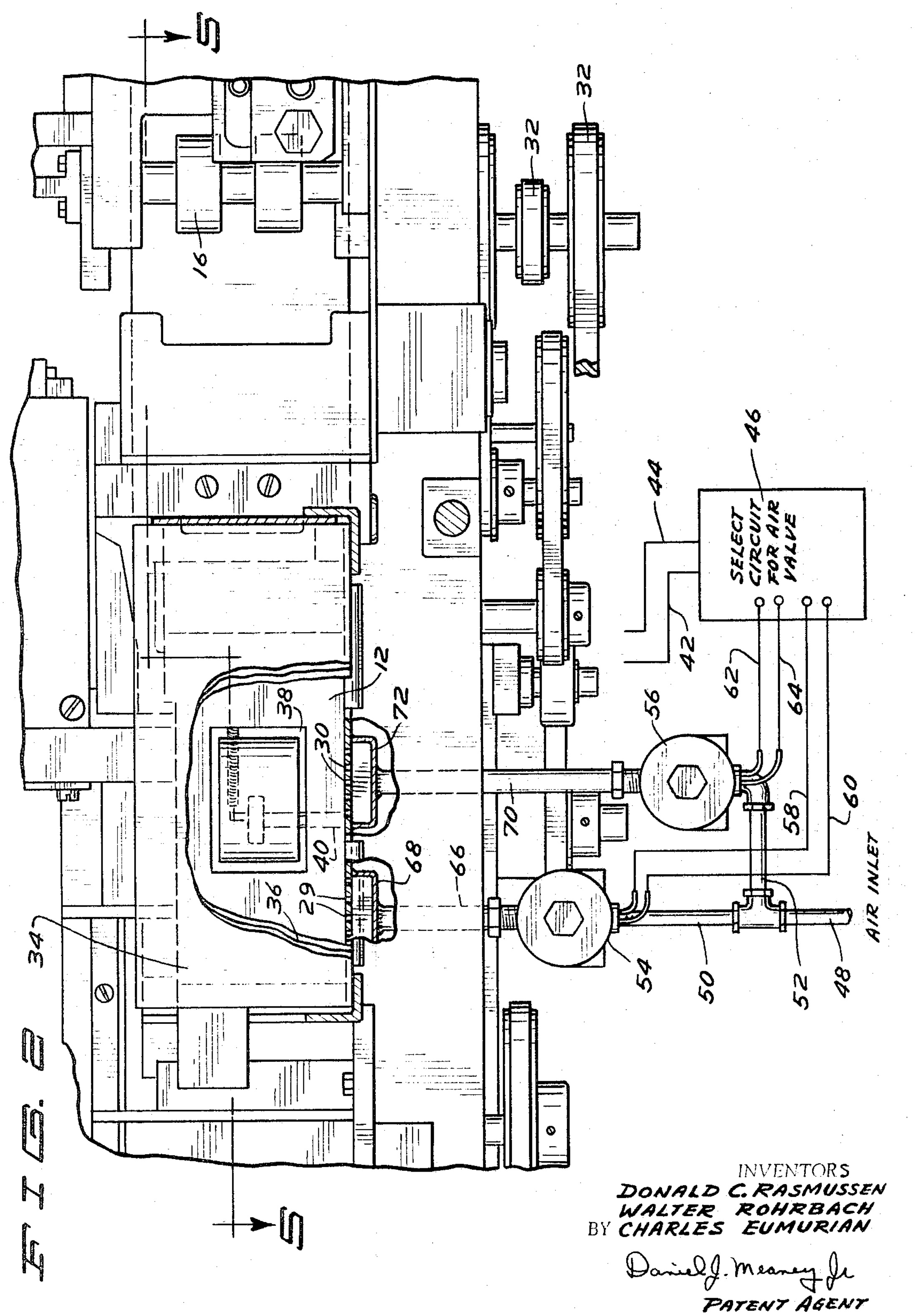
FIG. 2 is a front view of FIG. 1, showing in greater detail the structure of the device.

FIGURE 2 is a front view of FIGURE 1 showing in greater detail the structure of the device. The front view shows a movable stacking wall 34 which holds the card stack 10 of FIGURE 1. The movable stacking wall 32 is fragmented at 36 to show an intermediate card stop 38 located in the stationary stacking wall 12. The intermediate card stop rotates about shaft 40 to accommodate a punch card of a shorter length. The front view shows a driving arrangement generally as 32, driving the associated rollers.

The intermediate card stop 38 is shown in a position to accommodate long cards as shown in FIGURE 1. In this embodiment, the use of the air jets 29 and 30 is dependent upon the position of the intermediate card stop 38.

With the card stop 38 as shown, only the air jets 29 are operative. When the card stop is rotated about shaft 40 to its alternate position, only air jets 30 are operative. A switch (shown as element 152 in FIGURE 6) is disposed to close in response to the card stop 38 being rotated. The closing of the switch will complete an electrical circuit via leads 42 and 44 to a select circuit for air valves 46 which includes the necessary selection scheme to select and energize the appropriate air valve. The select circuit 46 would include a source of electric power and the circuitry, such as a set of normally closed and normally open relays (not shown), which circuitry may be made by one skilled in the art using known elements.

Briefly, since FIGURE 2 shows the card stop 38 in a position to stack long cards, air jets 29 would be operative to distribute air therethrough. The air would emanate from an outside supply of air (not shown) via input air line 48. Input air line 48 is bifurcated into two branch air lines 50 and 52. Air line 50 is coupled to air valve 54 and air line 52 is coupled to air valve 56. Air valves 54 and 56 may be air valves having electrically controlled elements which open and allow the passage of air therethrough when energized and which close upon being de-energized terminating the air flow. Air valve 54 is connected to the select circuit 46 via leads 58 and 60. Air valve 56 is connected to select circuit 46 via leads 62 and 64.

In the instant operation, air valve 54 is energized to allow the passage of air therethrough and air valve 56 is de-energized thereby restricting the passage of air.

Air valve 54 is coupled to a manifold 68 via line 66. Manifold 68 forces the air through the air jets 29 and between the stacked cards.

When air valve 56 is energized and air valve 54 is de-energized, air valve 56 will supply air to manifold 72 via air line 70. Manifold 70 forces the air through the air jets 30 and between the stacked cards.

Figure 3:
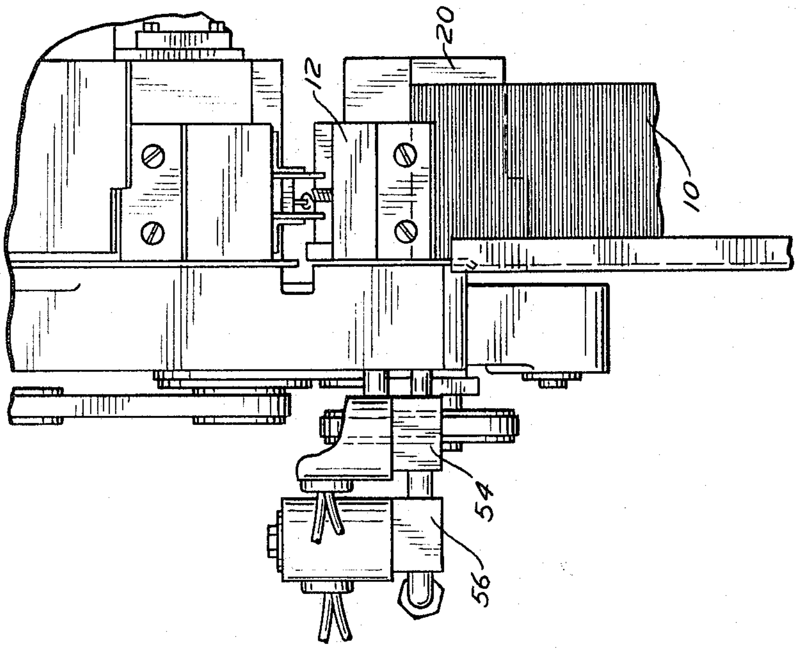
FIG. 3 is a fragmentary end view of FIGURE 1.

FIGURE 3 is a fragmentary end view of FIGURE 1 showing the relation between card stack 10, the stationary stacking wall 12 and the roller stacking assembly 20.

Figure 4:
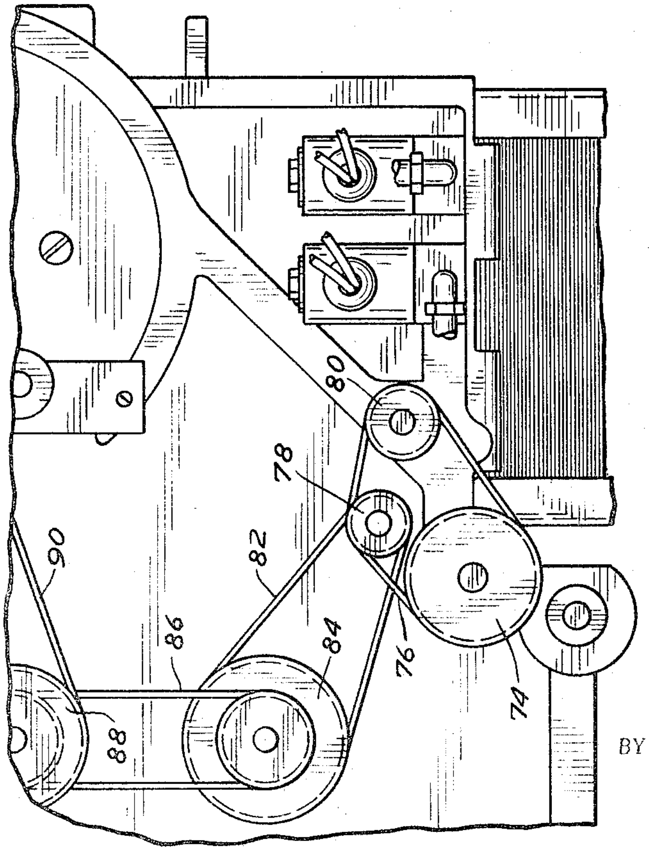
FIG. 4 is a fragmentary bottom view of FIG. 3 showing the driving means for the rollers of FIG. 1.

FIGURE 4 is a fragmentary bottom view of FIGURE 3 showing the embodiment for driving the various rollers which ultimately stack the cards. In FIGURE 4, Pulley 74 is driven in a clockwise direction. This pulley is coupled to a shaft roller 28 of FIGURE 1 which in turn drives the stacker roller 26 of FIGURE 1 in a counter-clockwise direction. Pulley 74 is driven by a belt 76 which in turn is driven by pulley 78. Belt 76 also drives pulley 80 in a clockwise direction. Pulley 78 is coupled via a shaft to the final feed roller 22 of FIGURE 1. Pulley 80 is coupled via a shaft to the assist roller 24 of FIGURE 1. Pulley 78 is driven by a belt 82 which is driven by pulley 84 in a clockwise direction. Pulley 84 is coupled to advancing roller 19 of FIGURE 1. Pulley 84 also is driven by a belt 86 which is driven by pulley 88 which in turn is driven by belt 90 connected to a motor (not shown).

Figure 5:
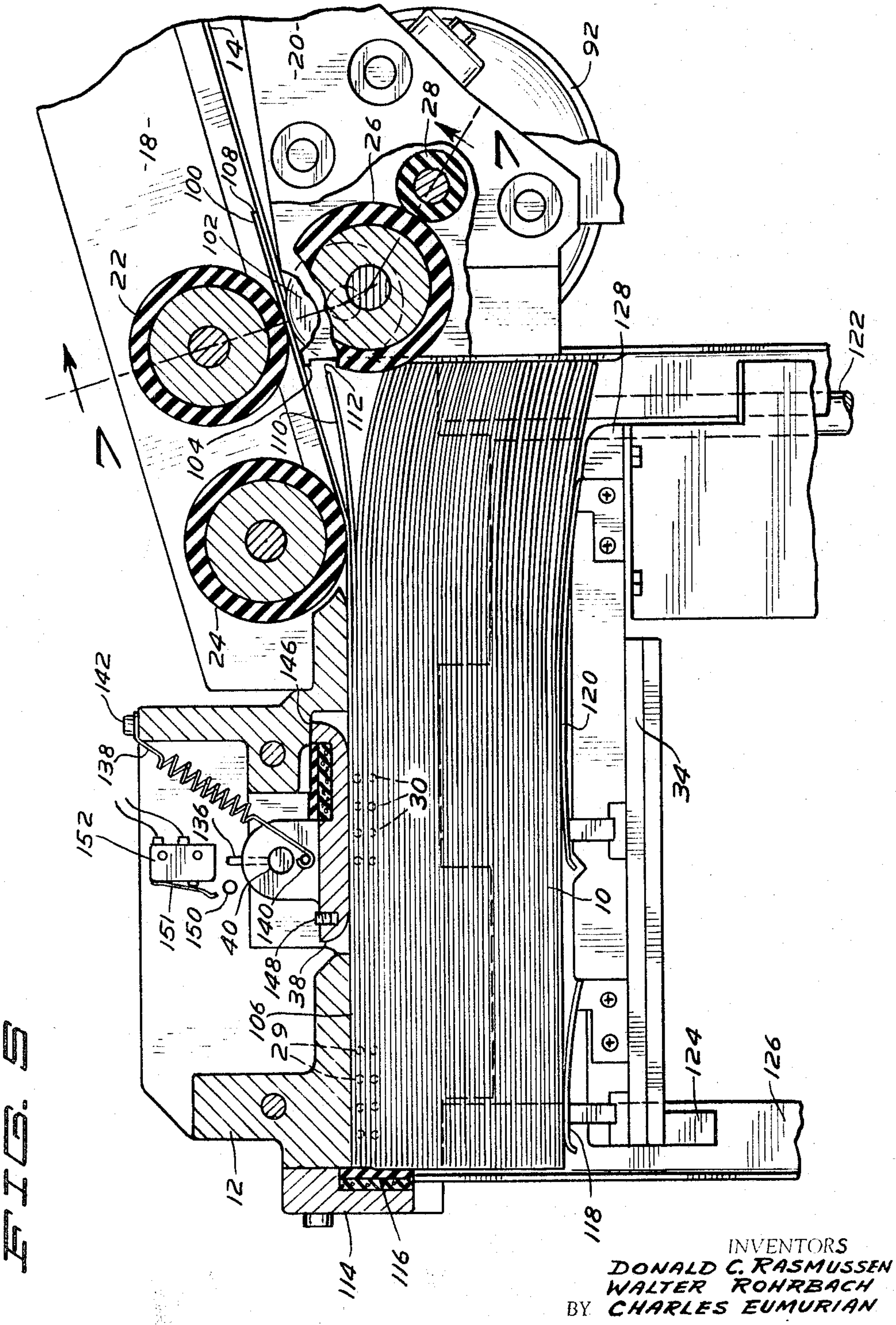
FIG. 5 is a section of FIG. 2 taken along section line 5—5 showing in greater detail the card stacking mechanism.

Now that the overall device has been described, attention will now be directed to the inventive and unique stacking system employed by the stacking device. FIGURE 5 is a section of FIGURE 2 taken along section line 5—5. This section shows in greater detail the stacking mechanism.

As described hereinbefore, a card is advanced on edge along predetermined path 14 by advancing roller 19 and idler roller 16. The path is formed by the tapered face of card plate 18 in cooperation with the taped face of roller stacking assembly 20. The leading edge of the card is advanced into the nip between final feed roller 22 and its associated idler roller 102 which roller is not externally driven. Final feed roller 22 is driven in a clockwise direction, thereby receiving and advancing the card. The received card will pass between the nip and cause idler roller 102 to rotate in a counter-clockwise direction. The leading edge of the card is then advanced into the vicinity of the card stack 10.

The final feed roller 22 and the idler roller 102 may be any rotatable member, such as but not limited to, a pulley and belt driving system. It is anticipated that one skilled in the art could substitute known elements which perform the same function as the above rotatable members.

A guide member 104 is located just past the nip of oppositely rotating rollers 22 and 24 and cooperates with the final feed roller 22 periphery to form a throat therebetween defining the predetermined path. The rollers 22 and 102 advance the leading edge 106 of the card 100 into an acute angle formed between the stationary stacking wall 12 substantially intersecting with the last card 110 of the stack.

As the leading edge 106 is advanced into the acute angle formed by stationary stacking wall 12 and the last card of the stack 110, the assist roller 24 is positioned to engage and assist the final feed roller 22 and idler 102 in stacking the card. However, assist roller 24 is positioned such that when the trailing edge 108 of card 100 has passed the nip of rollers 22 and 102 and is being guided by guide member 104, the assist roller will continue to advance the card 100 into the card stack 10. Also, the assist roller 24 is disposed relative to the final feed roller 22 and idler 102, guide member 104 and the acute angle formed by the stationary stacking wall 12 and the last card 110 of the stack to transversly flex the card relative to its predetermined path of travel. Thus the assist roller 24 concurrently flexes and advances card 100 which is the card being stacked.

As the assist roller 24 advances the card, the trailing edge 108 will subsequently leave the nip of rollers 22 and 102 and still be advanced by assist roller 24, as the trailing edge of the card passes the guide member 104, the trailing edge of the card will snap away from the guide member due to the card's tendency to straighten itself relative to the predetermined path. After the trailing edge of the card has snapped, the guide member 104 serves as a means of keeping the trailing edge away from the nip of the roller.

Concurrently, as the trailing edge of the assist roller 24 will drive the leading edge 106 of card 100 into a stop member 114 disposed to form an end wall with stationary stacking wall 12. The leading edge 106 of the card 100 will come into contact with the stop member 114. The stop member 114 is shown to have a resilient means 116 incorporated therein having sponge rubber covered by a polyurethane facing. The stop member 114 may be of any material but the advantage of the above embodiment will become apparent.

The leading edge 106 will contact the stop member 114, particularly the resilient means 116, which will cause the card to slightly rebound back toward the throat. The card would bounce off stop member 114, but the addition of the resilient means 116 will dampen the rebounce as well as protect the leading edge 106 of the card 100 from damage as a result of impacting with the stop member 114.

As the trailing edge of the card snaps away from the guide member 104 and as the card is slightly rebounded off of the stop member 114, the trailing edge comes into contact with the periphery of the stacking roller 26 which urges the trailing edge of the snapped card away from the throat. This is to prevent any impact between the trailing edge of the stacked card and the leading edge of a subsequent card being stacked. In FIGURE 5, the trailing edge 112 of card 110 is being snapped into the stacking roller 26. Stacking roller 26 will urge the trailing edge away from the throat as is being done upon the cards in card stack 10.

Stacking roller 26 is driven in a counter-clockwise direction by shaft roller 28. Further, the stacking roller is disposed relative to the stop member 114 such that the distance between the stacking roller 22 periphery and the stop member 114 is less than the peripheral dimension of the card. In the instant case, the peripheral dimension of the card is that distance between the leading edge and the trailing edge of the card. In this embodiment, the longitudinal axis of the card is parallel to the predetermined path, but it is anticipated that the cards could be stacked on their shortest edges thereby making the longitudinal axis of the card normal to the path of travel. However, the distance between the leading edge and the trailing edge would still be the peripheral dimension of the card within the spirit of the invention.

In this embodiment, the stacking roller 26 is designed to rotate at a slower speed than the feed roller 22 and the assist roller 24. The driving means for the rollers are supported by the structure 92.

FIGURE 5 also shows other elements which cooperate to stack the cards in card stack 10. Specifically a movable stacking wall 34 is parallel to stationary stacking wall 12 and is disposed to urge the card stack 10 toward the stationary stacking wall 12 via springs 118 and 120. On the right side of FIGURE 5, the movable stacking wall 34 is guided by a rod 122 located below the stacking surface which guides the movable stacking wall 34 by means of a slidably mounted bearing block (not shown) joined by a U-shaped support (not shown). The left side is guided by a pedestal 122 which is slidably mounted on channel 126. It is anticipated that any means employed to movably support the card stack may be used. The movable stacking wall 34 has its right side 128 shaped to receive the trailing edges of the cards as the stacking roller 26 urges the trailing edges away from the throat. Also the air jets 29 will distribute air between the cards to slightly separate the stacked cards to provide an air cushion in the vicinity of the stacking wall and the card being stacked.

In this invention, use is made of the edge of the card. The edge of each card is usually identical thereby having an advantage over the card surface which may not be identical due to the presence of random punch holes. Also by using the edge of the card, the card can positively be urged away from the throat by the stacking roller 26 due to the fact that the distance between the stacking roller periphery and the stop member is less than the card's peripheral dimension. As the trailing edge of the card is snapped into contact with the stacking roller 26, the card edge will be urged or displaced positively away from the throat.

Figure 7:
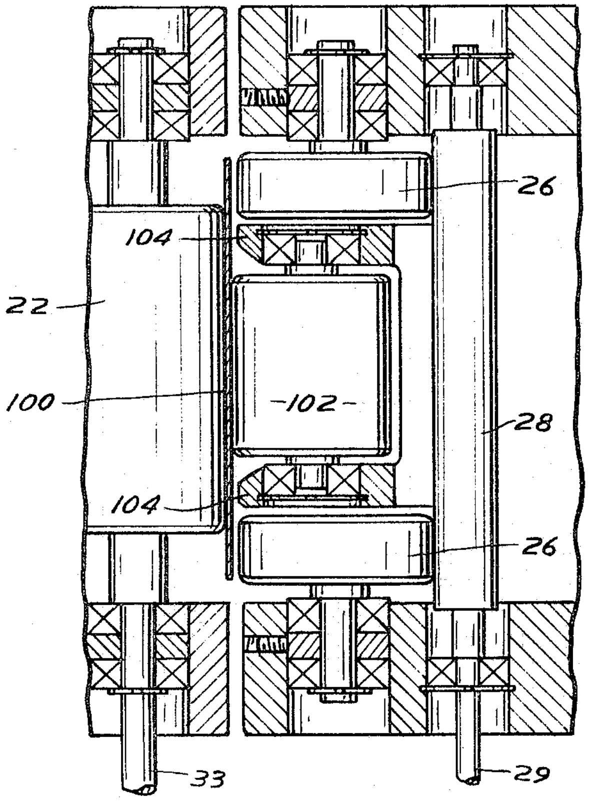
FIG. 7 is a section 7—7 of FIG. 5 showing in greater detail the relationship between the various rollers and the guide member.

Section 7—7 of FIGURE 5 is illustrated as FIGURE 7 hereof showing in greater detail the relationship between the various rollers and the guide member.

In FIGURE 7, the final feed roller 22 is shown advancing card 100 in cooperation with its idler roller 102. Final feed roller 22 is coupled via shaft 23 to its driving pulley 28 of FIGURE 4. In this embodiment, two guide members 104 are disposed on each side of the idler forming the throat between the guide members 104 and the periphery of final feed roller 22. The stacking roller comprises two rollers shown as 26 with the idler roller 102 intermediate them. Both stacking rollers 26 are driven by shaft roller 28. Shaft roller 28 is coupled via shaft 29 to pulley 74 of FIGURE 4. From this figure, it can be seen that the guide members 104 also keep the surface of card 100 from contacting the stacking roller 26 which is rotating at a slower speed.

Referring again to FIGURE 5. As was discussed, the high speed card stacker will stack either 80 column or 51 column punched cards. In the operation just described, the 80 column punched card operation was illustrated for purpose of example. However, this embodiment may quickly be made to accommodate the shorter 51 column punched cards by the use of the intermediate card stop 38. This is accomplished by manually pushing an element 136 which will rotate the card stop 38 clockwise about shaft 40. This will cause end 146, which is in contact with the stationary stacking wall 12, to become separated therefrom. Subsequently, the end of the card stop 38 having member 148 will come into contact with the stop 150 and card stop 38 will urge contacting element 151 of switch 152 into a closed position. Leads 154 and 156 of switch 152 subsequently connect (not shown) to leads 42 and 44 of FIGURE 2.

The card stop 38 shown in FIGURE 5 is held in place by spring 138 which is pivotally connected to the card stop 38 by pin 140. The other end of spring 138 is connected to the stationary stacking wall 12 at point 142. In this position, the pin 140 is below the center of shaft 40.

Figure 6:
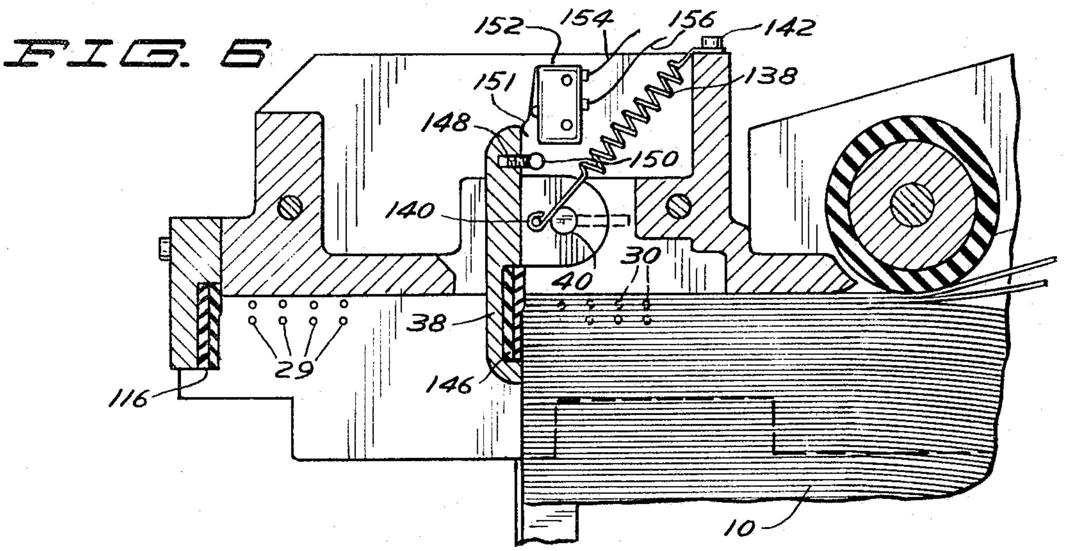
FIG. 6 illustrates the intermediate card stop in its alternate position to accommodate 51 column punched cards.

FIGURE 6 shows the intermediate card stop in its alternate position to accommodate the 51 column punched cards. The pin 140 is to the left of the center of shaft 40. The intermediate card stop 30, when disposed normal to the card stack, is positioned so that the distance between its stop member 146 and the periphery of stacking roller 26 is less than the peripheral dimension of the card. This insures that the high speed stacking will be accomplished for the shorter cards.

When the contacting element 151 of switch 152 is closed, the air jets 30 become operative and air jets 29 are not operative in accordance with the air valving scheme previously described.

It will also be understood that any appropriate stacking system may be utilized with the inventive high speed card stacking device.

The above illustrative embodiment comprises a preferred embodiment of the invention. However, this illustration is not intended to limit the possibilities of insuring the features of the high speed card stacking device. The device disclosed herein is an example of an arrangement in which the inventive features of this disclosure may be apparent to one skilled in the art that certain modifications may be made within the spirit of the invention as defined by the appended claims.

What is claimed is:

1. A high speed card stacking device having means to advance a card on edge along a predetermined path, comprising, (a) a pair of oppositely rotating rollers disposed to receive and advance the card;

(b) a guide member cooperating with one of the rollers to form a throat therebetween defining the predetermined path;

(c) a stationary stacking wall substantially intersecting with the last card of a movably supported stack to form an acute angle to receive the leading edge of the card being advanced by the rollers;

(d) an assist roller disposed relative to the rollers to engage and advance the card when the trailing edge thereof has been advanced into the acute angle formed by the stacking wall and the last card of the stack, the assist roller being disposed to transversely flex the card relative to its predetermined path, while advancing the trailing edge past the guide member, the trailing edge of the card snapping away from the guide member due to the card's tendency to straighten itself relative to the predetermined path;

(e) a stop member cooperating with the stationary stacking wall to form an end wall and positioned to contact the leading edge of the card being stacked causing the card to slightly rebound back toward the throat; and (f) a stacking roller positioned such that the distance between the stacking roller periphery and the stop member is less than the peripheral dimension of the card, the stacking roller further disposed relative to the guide member to urge the trailing edge of the snapped card away from the throat to prevent impact between the trailing edge of the stacked card and the leading edge of a subsequent card being stacked.

2. A high speed stacking device as set forth in claim 1, further comprising, (g) a movable stacking wall cooperating with the stop member and parallel to the stationary stacking wall, the movable stacking wall including means for urging the cards into a stack relationship against the stationary wall and being further disposed to permit the assist member roller to urge the trailing edges of cards previously stacked away from the throat; and (h) a source of air located below the stacked cards including means for distributing the air therebetween to slightly separate the stacked cards to provide an air cushion in the vicinity of the stationary stacking wall and the card being stacked.

3. A high speed card stacking device having means to advance a card on edges along a predetermined path, comprising, (a) a driving roller;

(b) an idling roller positioned to be driven by the driving roller, the rollers disposed to receive and advance the card;

(c) guide members cooperating with the driving roller to form a throat therebetween defining the predetermined path;

(d) a stationary stacking wall substantially intersecting with the last card of a movably supported stack to form an acute angle to receive the leading edge of the card being advanced by the rollers;

(e) an assist roller disposed relative to the rollers to engage and advance the card when the trailing edge thereof has been advanced into the acute angle formed by the stacking wall and the last card, the assist roller being disposed to transversely flex the card relative to its path of travel while advancing the trailing edge past the finger-shaped guide members, the trailing edge of the card snapping away from the guide member due to the card's tendency to straighten itself relative to the predetermined path; and (f) a stop member including a resilient means, the stop member cooperating with the stationary stacking wall to form an end wall and positioned to impact the leading edge of the card being stacked causing the card to slightly rebound back toward the throat, the resilient means dampening the card's rebound back toward the throat; and (g) a rotating stacking roller positioned such that the distance between the stacking roller periphery and the stop member is less than the peripheral dimension of the card, the stacking roller further disposed relative to the guide member to urge the trailing edge of the snapped card away from the throat to prevent impact between the trailing edge of the stacked card and the leading edge of a subsequent card being stacked.

4. A device as set forth in claim 3, further comprising, (h) a movable stacking wall cooperating with the stop member and parallel to the stationary stacking wall, the movable stacking wall including means for urging the cards into a stack relationship against the stationary wall and being further disposed to permit the assist member roller to urge the trailing edges of cards previously stacked away from the throat; and (i) a source of air located below the stacked cards including means for distributing the air therebetween to slightly separate the stacked cards to provide an air cushion in the vicinity of the stationary stacking wall and the card being stacked.

5. A high speed card stacking device having means to advance a card on edge along a predetermined path, comprising, (a) a first rotatable member;

(b) a second rotatable member disposed to cooperate with the first rotatable member to receive and advance the card;

(c) a guide member cooperating with one of the rotatable members to form a throat therebetween defining the predetermined path;

(d) a stationary stacking wall substantially intersecting with the last card of a movably supported stack to form an angle to receive the leading edge of the card being advanced by the rotatable member;

(e) a rotatable assist member disposed relative to the first and second rotatable members to engage and advance the card when the trailing edge thereof has been advanced into the acute angle formed by the stacking wall and the last card of the stack, the assist rotatable member being disposed to transversely flex the card relative to its predetermined path while advancing the trailing edge past the guide member, the trailing edge of the card snapping away from the guide member due to the card's tendency to straighten itself relative to the predetermined path;

(f) a stop member cooperating with the stationary stacking wall to form an end wall and positioned to contact the leading edge of a card being stacked causing the card to slightly rebound back toward the throat; and (g) a rotatable stacking member positioned such that the distance between the stacking member periphery and the stop member is less than the peripheral dimension of the card, the stacking member further disposed relative to the guide member to urge the trailing edge of the snapped card away from the throat to prevent impact between the trailing edge of the stacked card and the leading edge of a subsequent card being stacked.

6. A device as set forth in claim 5, further comprising, (h) a movable stacking wall cooperating with the stop member and parallel to the stationary stacking wall, the movable stacking wall including means for urging the cards into a stack relationship against the stationary wall and being further disposed to permit the assist member roller to urge the trailing edges of cards previously stacked away from the throat; and (i) a source of air located below the stacked cards including means for distributing the air therebetween to slightly separate the stacked cards to provide an air cushion in the vicinity of the stationary stacking wall and the card being stacked.

7. A high speed card stacking device having means to advance a card on edge along a predetermined path, comprising, (a) a continuously rotating driver roller;

(b) an idler roller positioned to be driven by the driving roller, the rollers disposed to receive and advance the card;

(c) a plurality of guide members cooperating with the driving roller to form a throat therebetween defining the predetermined path;

(d) a stationary stacking wall substantially intersecting with the last card of a movably supported stack to form an acute angle to receive the leading edge of the card being advanced by the rollers;

(e) a continuously rotating assist roller disposed relative to the rollers to engage and advance the card when the trailing edge thereof has been advanced into the acute angle formed by the stacking wall and the last card of the stack, the assist roller being disposed to transversely flex the card relative to its predetermined path, while advancing the trailing edge past the guide member, the trailing edge of the card snapping away from the guide member due to the card's tendency to straighten itself relative to the predetermined path;

(f) a stop member including a resilient means, the stop member cooperating with the stationary stacking wall to form an end wall and positioned to impact the leading edge of the card being stacked causing the card to slightly rebound back toward the throat, the resilient means dampening the card's rebound back toward the throat; and (g) a continuously rotating stacking roller positioned such that the distance between the stacking roller periphery and the stop member is less than the peripheral dimension of the card, the stacking roller further disposed relative to the guide member to urge the trailing edge of the snapped card away from the throat to prevent impact between the trailing edge of the stacked card and the leading edge of a subsequent card being stacked.

8. A high speed stacking device as set forth in claim 7, further comprising, (h) a movable stacking wall cooperating with the stop member and parallel to the stationary stacking wall, the movable stacking wall including means for urging the cards into a stack relationship against the stationary wall and being further disposed to permit the assist member roller to urge the trailing edges of cards previously stacked away from the throat; and (i) a source of air located below the stacked cards including means for distributing the air therebetween to slightly separate the stacked cards to provide an air cushion in the vicinity of the stationary stacking wall and the card being stacked.

9. A method for stacking cards at a high speed having means to advance a card on edge along a predetermined path, comprising, (a) receiving and advancing a card by a pair of oppositely rotating rollers;

(b) guiding the card through a throat formed by a guide member and one of the oppositely rotating rollers;

(c) guiding the leading edge of the card into a stack having stop member which contacts the leading edge of the card being stacked to slightly rebound back toward the throat;

(d) flexing the trailing edge of the card transversely to the predetermined path;

(e) snapping the flexed trailing edge of the card away from the throat due to the card's tendency to straighten itself relative to the predetermined path; and (f) urging he trailing edge of the rebounded card away from the throat by means of a rotatable stacking roller positioned such that the distance between the stacking roller periphery and the stop member is less than the peripheral dimension of the card, the trailing edge of the rebounded card being urged away from the throat to prevent impact between the trailing edge of the stacked card and the leadng edge of a subsequent card being stacked.

10. A high speed card stacking device having, in combination, (a) a pair of rollers disposed to receive and advance a card on edge along a predetermined path;

(b) a guide member cooperating with the rollers forming a throat to define the predetermined path;

(c) a stationary stacking wall substantially intersecting with the last card of a movably supported stack to form an acute angle to receive the leading edge of the card being advanced by the rollers;

(d) an assist roller disposed relative to the rollers to engage and advance the card when the trailing edge thereof has been advanced into the acute angle formed by the stacking wall and the last card of the stack, the assist roller being disposed to transversely flex the card relative to its predetermined path, while advancing the trailing edge past the guide member, the trailing edge of the card snapping away from the guide member due to the card's tendency to straighten itself relative to the predetermined path; and (e) a stop member cooperating with the stationary stacking wall to form an end wall and positioned to contact the leading edge of the card being stacked causing the card to slightly rebound back towards the throat; and (f) a movable stacking wall cooperating with the stop member and parallel to the stationary stacking wall, the movable stacking wall including means for urging the cards into a stack relationship against the stationary wall and being further disposed to permit the assist member roller to urge the trailing edges of cards previously stacked away from the throat; and (g) a source of air located below the stacked cards including means for distributing the air therebetween to slightly separate the stacked cards to provide an air cushion in the vicinity of the stationary stacking wall and the card being stacked.

References Cited by the Examiner

UNITED STATES PATENTS

| | | | |
|---|---|---|---|
| 3,052,467 | 9/1962 | Fertig | 271—71 |
| 3,087,724 | 4/1963 | Snowdon | 271—87 X |
| 3,087,725 | 4/1963 | Duncan | 271—87 X |
| 3,120,384 | 2/1964 | Fux | 271—68 |
| 3,139,278 | 6/1964 | Maidment | 271—71 |

M. HENSON WOOD, Jr., *Primary Examiner.*

R. A. SCHACHER, *Assistant Examiner.*